United States Patent
Alzen (10) Patent No.: US 11,533,839 B2
(45) Date of Patent: Dec. 27, 2022

(54) SYSTEM AND METHOD FOR CONTROLLING A SELF-PROPELLING LAWNMOWER

(71) Applicant: Globe (Jiangsu) Co., Ltd., Jiangsu (CN)

(72) Inventor: Jimmy Alzen, Norrahammar (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 489 days.

(21) Appl. No.: 16/607,560

(22) PCT Filed: Dec. 30, 2017

(86) PCT No.: PCT/CN2017/120393
§ 371 (c)(1),
(2) Date: Oct. 23, 2019

(87) PCT Pub. No.: WO2019/127568
PCT Pub. Date: Jul. 4, 2019

(65) Prior Publication Data
US 2020/0137953 A1 May 7, 2020

(51) Int. Cl.
*A01D 34/00* (2006.01)
*G05D 1/02* (2020.01)

(52) U.S. Cl.
CPC .......... *A01D 34/008* (2013.01); *G05D 1/028* (2013.01); *G05D 1/0265* (2013.01); *G05D 2201/0208* (2013.01)

(58) Field of Classification Search
CPC .... A01D 34/008; G05D 1/0265; G05D 1/028; G05D 2201/0208
See application file for complete search history.

(56) References Cited

U.S. PATENT DOCUMENTS 9,575,160 B1\* 2/2017 Davis .................... G01S 13/931
2009/0034973 A1\* 2/2009 Sakamoto .......... H04Q 11/0067
398/58

(Continued)

FOREIGN PATENT DOCUMENTS

CN 103488172 A 1/2014
WO 9915941 A1 4/1999

(Continued)

OTHER PUBLICATIONS

V. Dogan, B. Miodrag, N. Vukoje, G. Mančić and M. Živanov, "A novel solution for realisation of data transfer in borehole measurement systems," 2012 Proceedings of the 35th International Convention MIPRO, 2012, pp. 118-122 (Year: 2012).\*

(Continued)

*Primary Examiner* — Nicholas Kiswanto
*Assistant Examiner* — Hushmeen J Khan
(74) *Attorney, Agent, or Firm* — Rooney IP, LLC (57) ABSTRACT

A method and a system for controlling a self-propelling lawnmower including the self-propelling lawnmower having a control unit and at least one sensor, a boundary wire and a signal generator. The self-propelling lawnmower moves across an area surrounded by the boundary wire. By encoding a data frame with a recognition code in an alternating current that is Direct Current, DC-balanced and that is randomly transmitted within a predetermined period of time, by means of the signal generator, to the boundary wire a system robust against interference is accomplished. The data frame burst is received by a sensor and decoded by a control unit in the lawnmower. By comparing the received recognition code with a stored recognition code, the control unit determines that the lawnmower is on the inside of the boundary wire if the received recognition code matches the stored recognition code, and on the outside if the received (Continued)

recognition code matches the inverse of the stored recognition code.

14 Claims, 4 Drawing Sheets

(56) References Cited

U.S. PATENT DOCUMENTS

| | | | |
|---|---|---|---|
| 2012/0029754 A1* | 2/2012 | Thompson | B60L 15/2036 901/1 |
| 2012/0230453 A1* | 9/2012 | Shih | H04L 27/2675 375/348 |
| 2013/0154688 A1 | 6/2013 | Petereit et al. | |
| 2016/0100521 A1 | 4/2016 | Halloran et al. | |
| 2016/0366818 A1* | 12/2016 | Ouyang | G05D 1/028 |

FOREIGN PATENT DOCUMENTS

| | | | |
|---|---|---|---|
| WO | 2013102417 A1 | 7/2013 | |
| WO | 2014086498 A1 | 6/2014 | |
| WO | WO-2017051662 A1 * | 3/2017 | A01B 69/00 |

OTHER PUBLICATIONS

Search Report and Written Opinion in related International Patent Application No. PCT/US2017/120393 dated Sep. 27, 2018; 6 pages.

* cited by examiner

| 0 | 0 | 1 | 0 | 0 | 1 | 1 | 0 | 1 | 1 | 0 | 1 |

Fig. 6

| 0 | 0 | 1 | 1 | 0 | 1 | 0 | 0 | 1 | 1 | 0 |

Fig. 7

| 0 | 0 | 1 | 1 | 0 | 1 | 0 | 1 | 0 | 1 | 0 | 1 | 1 | 0 |

Fig. 8

| 1 | 1 | 0 | 1 | 0 | 1 | 0 | 1 | 0 | 1 | 0 | 0 | 1 | 0 | 1 | 0 |

SYSTEM AND METHOD FOR CONTROLLING A SELF-PROPELLING LAWNMOWER

TECHNICAL FIELD

The present invention relates generally to a system and method for controlling a self-propelling lawnmower, and more specifically for keeping the self-propelling lawnmower inside an area encircled by a boundary wire.

BACKGROUND ART

In prior art, self-propelled lawnmowers are generally known. For example, EP 1 025 472 discloses a battery-operated lawnmower having a control unit for determining the travel direction and speed of the lawnmower. The surface to be mowed is defined by a border delimitation wire. Two signals with alternating voltage are applied simultaneously by a signal generator to the border delimitation wire. The first signal oscillates at a first frequency and the second signal oscillates with a second frequency. The second signal oscillates at twice the frequency of the first signal. The two signals create alternating electromagnetic fields, which are detected by receiving coils in the lawnmower. The received signals are evaluated in order to decide if the lawnmower is located within or outside the border delimitation wire. This is done by setting a reference point when the first signal crosses the zero line. Then the system checks where a subsequent maximum of the second signal is located. If the subsequent maximum of the second signal is on the plus side the lawnmower is determined to be within the border delimitation wire. If, however the subsequent maximum of the second signal is on the minus side the lawnmower is determined to be outside the border delimitation wire. Based on this determination the travel direction of the lawnmower is controlled.

Thus, according to EP 1 025 472 the determination if the lawnmower is inside or outside the border delimitation wire is done using fixed phasing. This puts high requirements on the electronics in the control unit, which then will be unnecessary complex and expensive. This solution is also very sensitive when it comes to interference.

US2016/0014955 discloses a method for operating a self-propelled lawnmower, which is moved within a surface that is surrounded by a border delimitation wire. Electrical signals are transmitted in the border delimitation wire and create an electromagnetic field that is sensed and evaluated by the lawnmower in order to determine if the lawnmower is inside or outside the surface encircled by the border delimitation wire. In order to improve the electromagnetic resistance against interference the electrical signals that are transmitted in the border delimitation wire are transmitted with a predetermined pattern. This predetermined pattern, as received by the lawnmower, is compared with a predetermined reference pattern by evaluating the received signal by means of correlation (convolution method). The result of the comparison is used to determine if the lawnmower is inside or outside border delimitation wire and to control the lawnmower accordingly.

Even if this method has improved the resistance against electromagnetic interference fields, the use of a convolution makes the method more complex. Furthermore, the electrical signals transmitted to the border delimitation wire are transmitted in form of bursts that require that the reception of the signals at the lawnmower need to be synchronized. Thus, there is need for a method and system for controlling a self-propelled lawnmower that is even more robust in withstanding interference and that does not require synchronization for receiving signals at the lawnmower.

SUMMARY OF INVENTION

An object of the present invention is to provide a method for controlling a self-propelling lawnmower and especially a method that is robust and resistant against interference during the determination whether the lawnmower is inside or outside a boundary wire.

According to one aspect of the present invention this object is achieved by a method performed by a system comprising the self-propelling lawnmower provided with a control unit and at least one sensor, a boundary wire and a signal generator and wherein the self-propelling lawnmower is configured to move across an area surrounded by the boundary wire. The method comprises encoding, by means of the signal generator, a data frame with a recognition code in an alternating current that is Direct Current, DC-balanced. The recognition code comprises a system code and a loop number code. Thereafter, the data frame is randomly transmitted within a predetermined period of time, by means of the signal generator, in form of a burst to the boundary wire. The randomly transmitted data frame burst is received, in the self-propelling lawnmower, by means of the at least one sensor and decoded, in the control unit, to retrieve the recognition code, i.e. the system code and the loop number code. Then it is determined, in the control unit, that the loop number code relates to the boundary wire and a comparison is made in the control unit between the decoded system code and a predetermined system code stored in a memory of the control unit. If the decoded system code matches the predetermined system code it is determined that the lawnmower is on the inside of the boundary wire and if the decoded system code matches the inverse of the predetermined system code it is determined that the lawnmower is on the outside of the boundary wire.

In an exemplary embodiment, the number of contiguous bits having the same value in the encoded data frame is restricted to a maximum of three or two contiguous bits.

In another exemplary embodiment, the loop number code of the data frame is provided as a header.

In yet another exemplary embodiment, the predetermined period of time is set to be within an interval of 3 to 20 milliseconds. The data frame is preferably between 0.6 to 1 millisecond.

In another exemplary embodiment, the randomness in the step of randomly transmitting the data frame in form of a burst is generated by a cryptographic True Random Number Generator in the signal generator.

Another object of the present invention is to provide a system for controlling a self-propelling lawnmower and especially a system that is robust and resistant against interference when the system determines whether the lawnmower is inside or outside a boundary wire.

According to another aspect the present invention this object is achieved by a system for controlling a self-propelling lawnmower to move across an area surrounded by a boundary wire. The system comprises the self-propelling lawnmower, the boundary wire and a signal generator, the lawnmower further comprises a control unit and at least one sensor, wherein the control unit comprises a processor and a memory and wherein the signal generator comprises a processor and a memory, the memories comprise instructions which when executed by the processors cause the system to:

encode, in the signal generator, a data frame with a recognition code in an alternating current that is Direct Current, DC-balanced, the recognition code comprising a system code and a loop number code, randomly transmit, within a predetermined period of time, the data frame in form of a burst from the signal generator to the boundary wire, receive, in the self-propelling lawnmower, the randomly transmitted data frame burst, by means of the at least one sensor, decode, in the control unit, the received data frame to receive the recognition code, i.e. the system code and the loop number code, determine, in the control unit, that the loop number code relates to the boundary wire, compare, in the control unit, the decoded system code with a predetermined system code stored in the memory of the control unit, and determine that the lawnmower is on the inside of the boundary wire if the decoded system code matches the predetermined system code, or determine that the lawnmower is on the outside of the boundary wire if the decoded system code matches the inverse of the predetermined system code.

In an exemplary embodiment, the system is further caused to restrict the number of contiguous bits having the same value in the encoded data frame to a maximum of three or two contiguous bits.

In yet another exemplary embodiment the system is further caused to provide the loop number code of the data frame as a header.

In another exemplary embodiment, the system is further caused to set the predetermined period of time within an interval of 3 to 20 milliseconds. The data frame may be set between 0.6 to 1 millisecond.

In a further exemplary embodiment the system is caused to generate the randomness, when randomly transmitting the data frame in form of a burst, by means of a cryptographic True Random Number Generator in the signal generator.

According to one aspect there is achieved a computer program comprising computer program code, wherein the computer program code being adapted, if executed by the processors of the signal generator and the control unit to implement the method according to any one of the exemplary embodiments.

By providing a method and a system for controlling a self-propelling lawnmower, that uses a DC-balanced alternating current encoded with a data frame comprising a recognition code and is randomly transmitted in form of a burst, it is possible to accomplish a robust and interference insensible system. By restricting the number of contiguous bits having the same value in the encoded data frame to a maximum of two or three contiguous bits the robustness can be further increased. The use of a cryptographic True Random Number Generator in the signal generator may further increase the robustness, especially against periodical interference such as competing systems for controlling self-propelling lawnmowers from neighboring properties.

BRIEF DESCRIPTION OF DRAWINGS

The invention is now described, by way of example, with reference to the accompanying drawings, in which.

DESCRIPTION OF EMBODIMENTS

In the following, a detailed description of exemplary embodiments controlling a lawnmower according to the present invention for will be presented.

Figure 1:
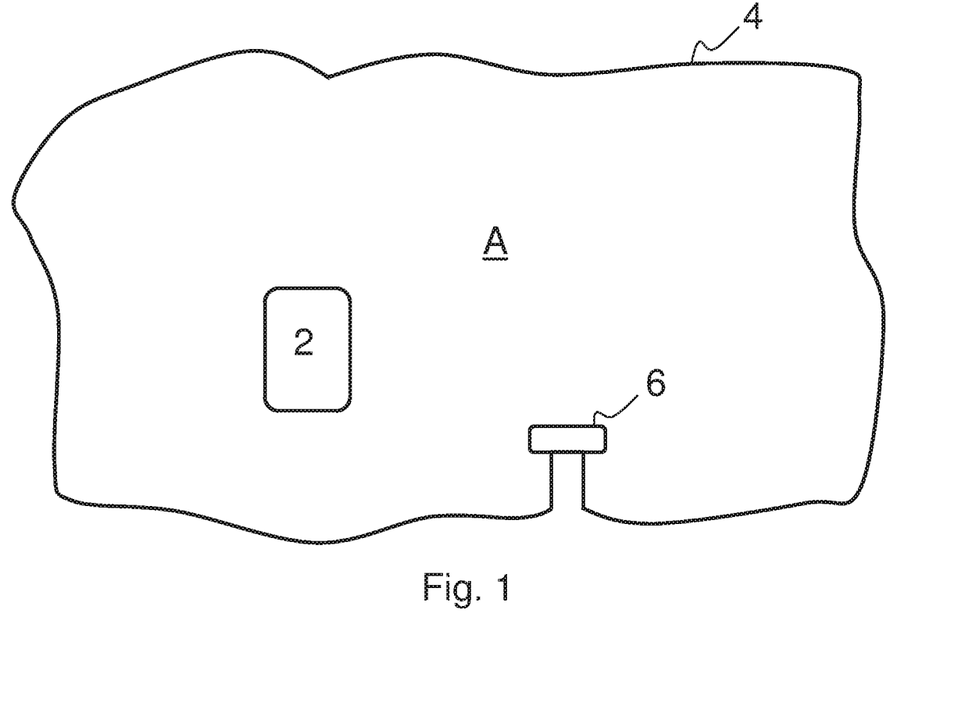
FIG. 1 a schematic view of a system for controlling a lawnmower.

FIG. 1 shows a system for controlling a self-propelling lawnmower 2 to move across an area A surrounded by a boundary wire 4. As is obvious the lawnmower is depicted somewhat enlarged for the sake of clarity. The boundary wire 4 may be configured in any way, such that it delimits the area A within which the self-propelling lawnmower 2 is allowed to move. The boundary wire 4 is preferably provided under the ground in the lawn, such that is not visible, but may also be provide on or above the ground. The boundary wire 4 could be an ordinary copper wire of single-core type. There are of course also other options, which is well-known by a person skilled in the art, such as multi stranded wire types. The system also comprises a signal generator 6 which feeds the boundary wire 4 with an Alternating Current, AC, signal to be closer described below.

Figure 2:
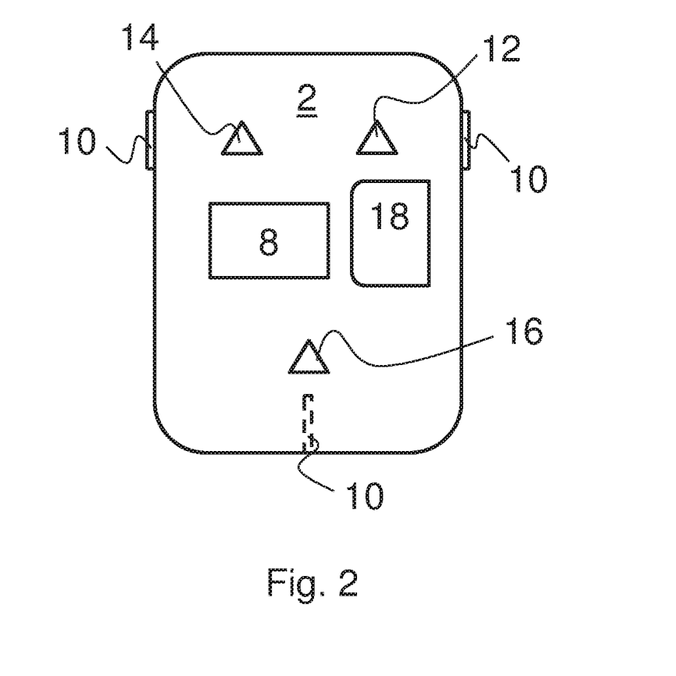
FIG. 2 is a schematic view of a lawnmower.

Turning now to FIG. 2, the lawnmower 2 will be closer described. The lawnmower 2 comprises a control unit 8, wheels 10, at least one sensor 12, 14 and/or 16 and a battery 18. The control unit 8, which will be closer described in conjunction with FIG. 3, comprises among other things a processor 80 for controlling the movement of the lawnmower 2. When the lawnmower 2 is in operation the sensors 12, 14 and 16 sense the magnetic field that is generated in the boundary wire 4. The sensed magnetic field (signal) is decoded in the control unit 8 in order to retrieve a recognition code. The recognition code will be closer described in conjunction with FIG. 5 to FIG. 9.

The recognition code comprises a loop number code that relates to the loop in a system having several loops that sent the out the recognition code. For example, the boundary wire 4 may have loop number code 0, a charging station loop may have the loop number code 1 and different guide wire loops may have the loop number codes 2 and 3. Thus, loop number code is used to distinguish different loops from each other which is necessary if the system comprises more loops than the boundary wire 4 loop. Thus, before the lawnmower 2 is controlled by the control unit 8, the control unit 8 needs to determine which loop number code that has been decoded in order to determine the proper control action. Preferably, the recognition code comprises four different loop number codes.

The recognition code also comprises a system code which is used to determine which system that sent out the recognition code. Thus, the decoded system code is compared with a predetermined system code stored in a memory 82, see FIG. 3, of the control unit 8. Based on this comparison it is determined that the lawnmower 2 is part of the system that sent out the recognition code if the decoded system code matches the predetermined system code.

The system code is further used to determine if the lawnmower 2 is inside or outside the boundary wire 4. Thus, as mentioned above the decoded system code is compared with the predetermined system code stored in the memory 82 of the control unit 8. Based on this comparison it is also determined that the lawnmower 2 is on the inside of the boundary wire 4 if the decoded system code matches the predetermined system code and that the lawnmower 2 is on the outside of the boundary wire 4 if the decoded system code matches the inverse of the predetermined system code. This determination is made if the loop number code relates to the boundary wire 4, for example is equal with 0. If no matches are found the decoded signal is ignored and the system waits for the next randomly generated burst to decode.

Figure 3:
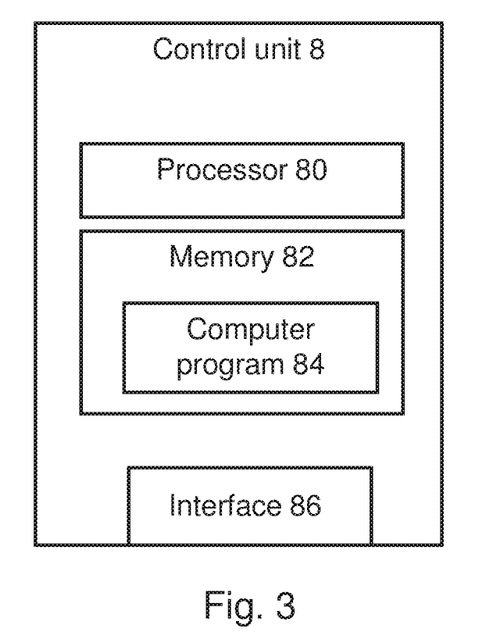
FIG. 3 is a schematic block diagram of a control unit in the lawnmower.

With reference to FIG. 3, the control unit 8 of the lawnmower 2 will be closer described. The control unit 8 comprises, as mentioned above the processor 80 and the memory 82. The memory 82 may comprise a computer program 84 comprising computer program code, i.e. instructions. The computer program code is adapted to implement the method steps performed by lawnmower 2 when the code is executed on the processor 80. The control unit 8 further comprises an interface 86 for communication with the sensors 12, 14 and 16, and a motor that operates the lawnmower 2.

The processor 80 may comprise a single Central Processing Unit (CPU), or could comprise two or more processing units. For example, the processor 80 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

Figure 4:
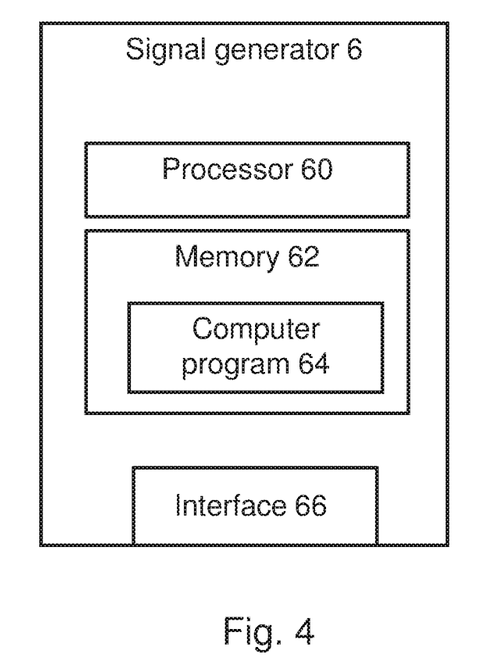
FIG. 4 is a schematic block diagram of a signal generator.

FIG. 4 depicts the signal generator 6, which also comprises a processor 60 and a memory 62. The memory 62 may comprise a computer program 64 comprising computer program code, i.e. instructions. The computer program code is adapted to implement the method steps performed by the signal generator 6 when the code is executed on the processor 60. The signal generator 6 further comprises an interface 66 for transmitting the generated AC signal to the boundary wire 4.

The AC signal generated by the signal generator 6 is amplified by a balanced transimpedance amplifier in a first step and is then further amplified with an operational amplifier. The gain of both these amplifiers is selected with two control signals from the processor 60 and each gain control changes the gain by a factor of 10. The processor 60 changes the gain when the signal is becoming too low or too high. This arrangement gives the system a high dynamic range of about 60 dB.

The signal generator 6 randomly transmits the generated AC signal as frames of data. The randomness is generated by a cryptographic true Random Number Generator, RNG, in the processor 60 to assure that the timing is completely nondeterministic. In an exemplary embodiment, the data frames may be between 0.6 to 1.0 milliseconds long, preferably 0.8 milliseconds long. The frame-to-frame spacing may be set between 3 and 20 milliseconds. The minimum spacing is selected such that it enables up to four boundary loops in one and the same installation. The maximum spacing may be selected such that a worst-case scenario reaction time is 40 milliseconds if every other pulse is lost due to interference. The use of the cryptographic true RNG in the signal generator is advantageous since it further increases the robustness, especially against periodical interference such as competing systems for controlling self-propelling lawnmowers from neighboring properties.

As for processor 80 also the processor 60 may comprise a single Central Processing Unit (CPU), or could comprise two or more processing units. For example, the processor 60 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 60 may also comprise a storage for caching purposes.

Figure 5:
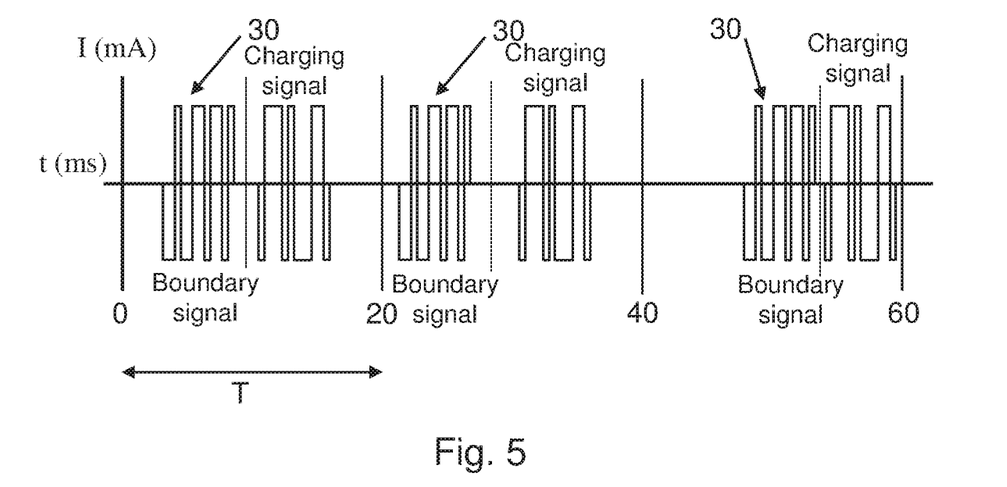
FIG. 5 shows exemplary bursts that are generated by the signal generator and received by a sensor in the lawnmower.

Turning now to FIG. 5 the AC signal that is generated by the signal generator 6 will now be closer described. In the AC signal, there is encoded a data frame 30 comprising a recognition code. In one exemplary embodiment, the data frame is binary. The data frame "carries" a symbol, which symbol comprises a pattern of ones and zeros in case of a binary data frame. The data frame may comprise 8 to 20 bits, i.e. the symbol length. Thus, one selects a number of bits to define the symbol length. If for instance 14 bits are chosen as a symbol length the number of symbols that are possible to use is $2^{14}=16384$. However, having this number of possible symbols is a problem when it comes to decoding of symbols in the control unit 8 of the lawnmower 2. Due to interference, it may be difficult distinguish between all the different symbols and thus it may be difficult to decide if the lawnmower 2 is inside or outside the boundary wire 4. In order to increase the robustness and resistance against interference several rules are applied to this set of symbols to narrow it down.

First of all, each allowed symbol should have an equal number of ones and zeroes. This will increase the reliability of the reception at the sensors 12, 14 and 16 and relaxes bandwidth requirements of the receiving electronics of the lawnmower 2. Having an equal number of ones and zeroes is called a "DC free" encoding or a DC-balanced encoding.

In an exemplary embodiment, all symbols that are equal to the bitwise inverse of another symbol are removed. This is necessary because a symbol will be received as the inverse when the mower is outside the boundary. Furthermore, in another exemplary embodiment the number of contiguous bits of the same value is restricted to a certain low value, for example two or three bits. This also increases the reliability of the reception and relaxes bandwidth requirements of the receiving electronics.

Returning now to FIG. 5 it is evident that the boundary signal or data frame is repeated randomly within the predetermined period of time T. It is also evident that the signal is DC-balanced, i.e. the data frame 30 comprises an equal number of ones and zeros. It should be understood that the size of the data frame 30 in FIG. 5 is exaggerated in order to clearly show the boundary signal. As mentioned above the data frame length is preferably about 0.6 to 1.0 milliseconds. As is further shown in FIG. 5 there is also disclosed a charging loop signal. As also mentioned above the predetermined period of time T, is such that there is room for at least four boundary loops in one and the same installation.

Figure 6:
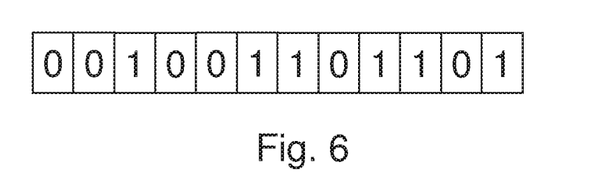
FIG. 6 to FIG. 9 show exemplary data frames.

Turning now to FIG. 6 to FIG. 9, different examples of binary data frames are shown. FIG. 6 is an example of a data frame with a 12-bit symbol having a maximum of two contiguous bits. This reduces the valid number of symbols to receive and decode in the lawnmower to 104.

Figure 7:
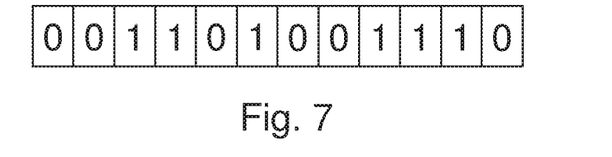

FIG. 7 shows a 12-bit symbol having a maximum of three contiguous bits. This will reduce the symbol set to 308 valid symbols.

Figure 8:
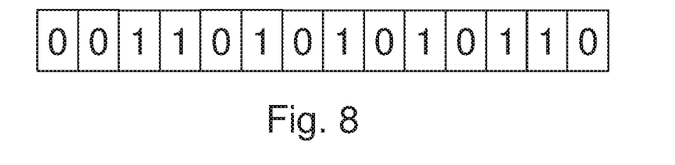

FIG. 8 shows a 14-bit symbol with a maximum of two contiguous bits, reducing the symbol set to 259 valid symbols.

Figure 9:
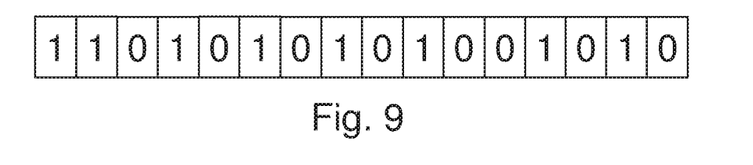

Finally, FIG. 9 shows a 16-bit symbol with a maximum of two contiguous bits, giving 648 valid symbols.

As mentioned above each frame contains one symbol. In the exemplary embodiment of FIG. 8, i.e. the 14-bit symbol with 2 maximum contiguous bits, 8 bits of data may be decoded by the control unit 8 of the lawnmower 2. The data is divided into a header comprising two bits and a body of six bits. The header may be interpreted as the loop number code. In other embodiments, the loop number code may be extracted in other ways from the decoded data. The boundary wire 4 would typically be set to loop number 0, and a first charging station loop would be loop number 1. The six last bits are enough to enable 64 unique system codes. The lawnmower 2 and the signal generator 6 (charging station) are set and agreed on a system code when the system is first powered up or during production testing. Three additional symbols are available for signaling and future enhancements.

Figure 10:
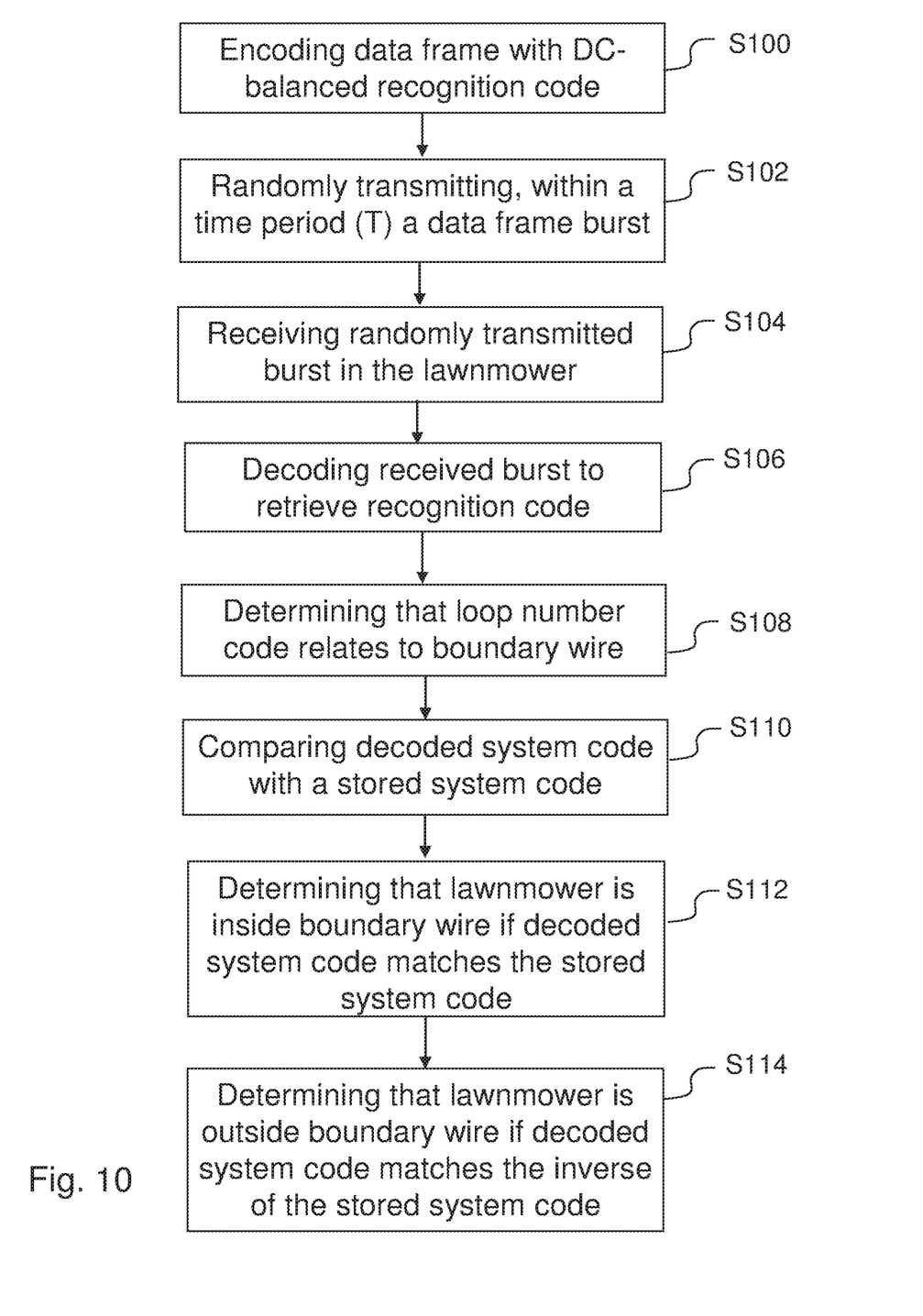
FIG. 10 is a flow chart of the method for controlling the lawnmower.

With reference to FIG. 10 the method performed by the above described system for controlling the self-propelling lawnmower 2 will be described. The method starts in step S100 in which the signal generator 6 encodes the data frame with a recognition code in an alternating current that is DC-balanced. As mentioned above the recognition code comprises the system code and the loop number code. The signal generator 6 then randomly transmits, in step S102, a data frame burst 30 to the boundary wire 4 within the predetermined period of time T. This burst 30 is then received, in step S104, in the self-propelling lawnmower 2, by means of at least one sensor 12, 14, 16. The sensor or sensors 12, 14 and 16 forward the received data frame burst 30 to the control unit 8 which decodes, in step S106, the received data frame to retrieve the recognition code, i.e. the system code and the loop number code. It is, determined by the control unit 8, in step S108, that the loop number code relates to the boundary wire 4. Thereafter, in step S110, the control unit 8, compares the decoded system code with a predetermined system code that is stored in the memory 82 of the control unit 8. If the decoded system code matches the predetermined system code the control unit 8 determines, in step S112, that the lawnmower 2 is on the inside of the boundary wire 4 or that the lawnmower is on the outside of the boundary wire 4, in step S114, if the decoded system code matches the inverse of the predetermined system code.

Thus, in the control unit 8, a zero-crossing detector, which may be realized in software, collects possible symbols all the time. Potential matches are checked against a symbol table as soon as enough transitions are collected. Error checking is made possible by the fact that only a few of all possible symbols are assigned given the different requirements of the data frame, as mentioned above. This described encoding scheme gives a strong error detection and is therefore very robust against interference.

Thus, the detection of if the lawnmower 2 is inside or outside the boundary wire is built into the encoding. The frame that are received by the control unit 8 of the lawnmower 2 will match a symbol if the mower is inside the boundary. If the mower is outside then a match will be found against the inverse of the received frame. This enables a robust inside/outside detection since the determination depends on receiving an entire correct frame and not on timing of up/down flanks which could easily be corrupted by interference.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method performed by a system for controlling a self-propelling lawnmower, the system comprising the self-propelling lawnmower having a control unit and at least one sensor, a boundary wire and a signal generator and wherein the self-propelling lawnmower is configured to move across an area surrounded by the boundary wire, the method comprising:
   encoding, by means of the signal generator, a data frame with a recognition code in an alternating current that is Direct Current Balanced, DC-balanced, the recognition code comprising a system code and a loop number code,
   transmitting the data frame in the form of a burst to the boundary wire at a random time within a predetermined period of time, by means of the signal generator,
   receiving, in the self-propelling lawnmower, the transmitted data frame burst, by means of the at least one sensor,
   decoding, in the control unit, the received data frame to retrieve the recognition code, i.e. the system code and the loop number code,
   determining, in the control unit, that the loop number code relates to the boundary wire,
   comparing, in the control unit, the decoded system code with a predetermined system code stored in a memory of the control unit, and
   determining that the lawnmower is on the inside of the boundary wire if the decoded system code matches the predetermined system code, or
   determining that the lawnmower is on the outside of the boundary wire if the decoded system code matches the inverse of the predetermined system code.

2. The method according to claim 1, wherein the number of contiguous bits having the same value in the encoded data frame is restricted to a maximum of three contiguous bits.

3. The method according to claim 1, wherein the number of contiguous bits having the same value in the encoded data frame is restricted to a maximum of two contiguous bits.

4. The method according to claim 1, wherein the loop number code of the data frame is provided as a header.

5. The method according to claim 1, wherein the predetermined period of time is set within an interval of 3 to 20 milliseconds.

6. The method according to claim 1, wherein the data frame is between 0.6 to 1 millisecond.

7. The method according to claim 1, wherein the randomness in the step of randomly transmitting the data frame in form of a burst is generated by a cryptographic True Random Number Generator in the signal generator.

8. A system for controlling a self-propelling lawnmower to move across an area surrounded by a boundary wire, comprising the self-propelling lawnmower, the boundary wire and a signal generator, the lawnmower further comprising a control unit and at least one sensor, wherein the control unit comprises a processor and a memory and wherein the signal generator comprises a processor and a memory, the memories comprising instructions which when executed by the processers cause the system to:

encode, in the signal generator, a data frame with a recognition code in an alternating current that is Direct Current Balanced, DC-balanced, the recognition code comprising a system code and a loop number code,     transmit the data frame in the form of a burst to the boundary wire at a random time within a predetermined period of time,     receive, in the self-propelling lawnmower, the transmitted data frame burst, by means of the at least one sensor,     decode, in the control unit, the received data frame to retrieve the recognition code, i.e. the system code and the loop number code,     determine, in the control unit, that the loop number code relates to the boundary wire,     compare, in the control unit, the decoded system code with a predetermined system code stored in the memory of the control unit, and     determine that the lawnmower is on the inside of the boundary wire if the decoded system code matches the predetermined system code, or     determine that the lawnmower is on the outside of the boundary wire if the decoded system code matches the inverse of the predetermined system code.

9. The system according to claim 8, further caused to restrict the number of contiguous bits having the same value in the encoded data frame to a maximum of three contiguous bits.

10. The system according to claim 8, further caused to restrict the number of contiguous bits having the same value in the encoded data frame to a maximum of two contiguous bits.

11. The system according to claim 8, further caused to provide the loop number code of the data frame as a header.

12. The system according to claim 8, further caused to set the predetermined period of time within an interval of 3 to 20 milliseconds.

13. The system according to claim 8, further caused to set the data frame between 0.6 to 1 millisecond.

14. The system according to claim 8, further caused to generate the randomness, when randomly transmitting the data frame in form of a burst, by means of a cryptographic True Random Number Generator in the signal generator.

\* \* \* \* \*